H. E. RICHARDS.
Coffee Roaster.
No. 33,453.  Patented Oct. 8, 1861.
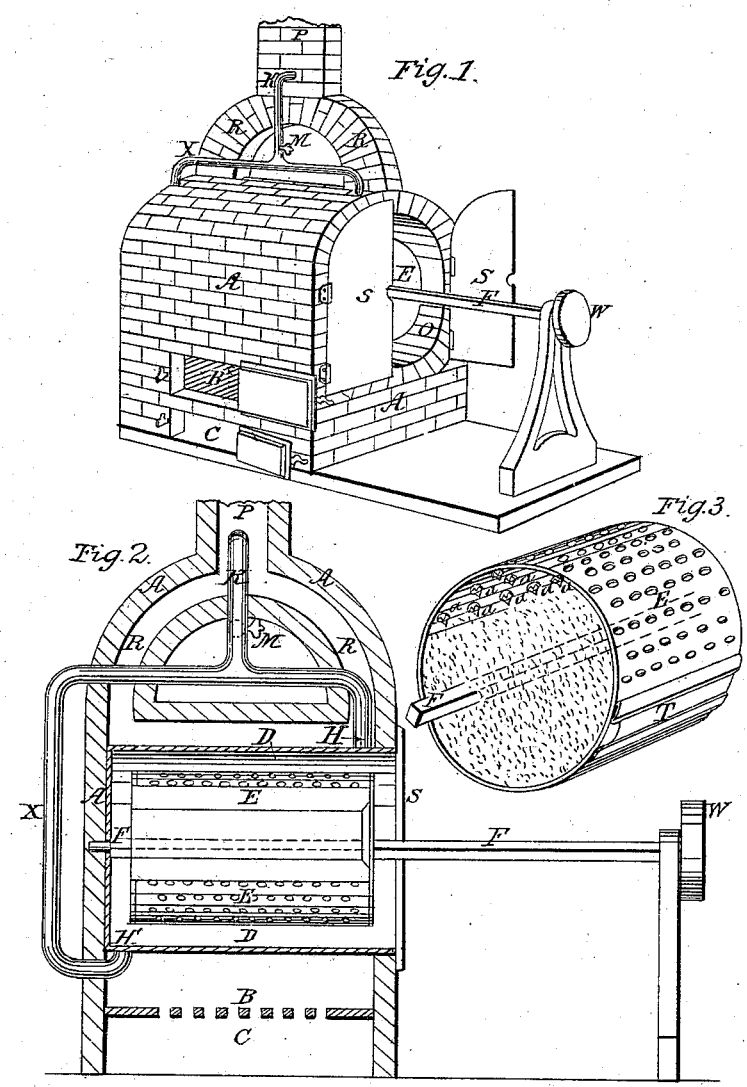

UNITED STATES PATENT OFFICE.

HENRY E. RICHARDS, OF NEWARK, NEW JERSEY.

IMPROVEMENT IN COFFEE-ROASTERS.

Specification forming part of Letters Patent No. 33,453, dated October 8, 1861.

*To all whom it may concern:*

Be it known that I, HENRY E. RICHARDS, of the city of Newark, in the county of Essex and State of New Jersey, have invented a new and useful Improvement in Coffee-Roasters; and I do hereby declare that the following is a full, clear, and exact description of the same, reference being had to the accompanying drawings, making a part of this specification, in which—

Figure 1 is a perspective view; Fig. 2, a longitudinal section, and Fig. 3 the coffee-canister, showing the action of the coffee stirring and falling when the canister is revolving.

The same letters indicate like parts in all the figures.

A is the brick-work or outer setting of the retort.

B is the furnace.

C is the ash-pit.

D is the interior of a retort of metal, set in the brick-work in such a manner that the flames of the furnace can pass entirely around it at the sides and enter the flues R R, and from thence pass into the chimney P. This retort is permanently closed at one end and may be opened or closed at the other by means of the doors S S. Passing from the top of the retort D at H, Fig. 2, is a pipe X, which enters the retort again at H'. This pipe is tapered at the top near the center by the pipe K, communicating with the chimney P.

M is a damper in the pipe K.

E is a perforated canister or cylinder (see Fig. 3) showing the sliding door T. This canister is formed of thin metal, and is punched as full of holes of a less size than a grain of coffee as the strength of the metal will allow. The perforations in E are made with a punch of less size than the hole required, in order to throw a burr inside at each hole, as represented at $a\ a\ a\ a\ a\ a$, Fig. 3.

F is a horizontal shaft, upon which the canister E is fitted in such a way that the canister will revolve with the shaft and yet is free to slide on the shaft into and out of the retort D.

The burrs $a\ a\ a\ a$, Fig. 3, are for the purpose of catching and holding the coffee and causing it partially to revolve with the canister, thus operating to thoroughly stir and disturb the coffee, as represented in Fig. 3, thus obviating the necessity of the spiral now used in cylinders for stirring the coffee, besides being far more thorough and uniform in action.

The operation of the roaster is as follows: The retort D is heated to a dull-red heat. The canister E is then charged with the coffee through the sliding door T, which is then closed and the canister passed inside of the retort D, and the doors S S are closed. The shaft F, by means of the pulley W, is then set to revolving, carrying with it the canister E. The damper M is then immediately opened and the moisture of the coffee, also the deleterious gases which are evolved in the first stages of the process of roasting, will pass off through H into the pipe K, and thence into the chimney. This part of the process will consume ordinarily five minutes, after which the aroma of the coffee begins to be given off. The damper M is then immediately closed, as it is highly desirable that this aroma which affords the valuable and agreeable flavor of the coffee should be preserved and not dissipated and lost, as is the case in the ordinary process of roasting. The damper M being thus closed, the aroma evolved from the coffee will be carried along by the hot air arising from the retort and will pass up into the pipe X at H, which, being exposed to the atmosphere cools, the air in the pipe X, causing it to fall to the bottom of the pipe, where it again enters the retort at H'. Thus from the time the damper is closed a complete and effective circulation of the aroma is maintained through and impregnating the coffee until the end of the process, which in all consumes about ten minutes. The time required to roast a charge of coffee by the ordinary method is from thirty to forty-five minutes. The charge is removed by stopping the shaft F, then opening the doors S S and drawing out the canister, when through the door T the coffee may be taken out and a new charge inserted.

The utility of my invention over any other known to me I state as follows: first, the thorough evenness with which the coffee is roasted, being perfectly stirred and all of it subjected to a uniform action of the heat; second, the preserving of all the aroma of the coffee, greatly adding to its market and intrinsic value; third, the durability of the canister, being subjected to wear out only by the action of the coffee and not exposed to be burned out, as is the case with the cylinders now used; fourth, economy of fuel, since a double amount of coffee over the present method may be roasted in any given time by the same quantity of fuel; fifth, the even distribution of the heat around the canister and the circulation through the pipe X from H to H'; sixth, the avoiding, by means of the use of the retort D, the exposure of the coffee to the deleterious gases arising from the fuel, the coffee roasted by the present method being thus injured, since the cylinder now used is heated by direct exposure to the action of the fire.

What I claim as new and of my own invention, and desire to secure by Letters Patent of the United States, is—

1. The combination and use of the pipe X and the retort D, substantially in the manner and for the purposes described.

2. The combination of the canister E, retort D, and pipe X, substantially in the manner and for the purposes described.

HENRY E. RICHARDS.

Witnesses:
 WM. B. GROOT,
 DANIEL F. TOMPKINS.